(12) United States Patent
Field et al.

(10) Patent No.: US 6,382,678 B1
(45) Date of Patent: May 7, 2002

(54) COUPLING ASSEMBLY

(75) Inventors: John C. Field, Adrian, MI (US); John C. Stemmler, Perrysburg, OH (US); Michael P. Wells, Holland, OH (US); Christopher E. Schadewald, Whitehouse, OH (US); Gregory A. Haunhorst, Perrysburg, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/397,397

(22) Filed: Sep. 16, 1999

Related U.S. Application Data

(60) Provisional application No. 60/120,751, filed on Oct. 2, 1998.

(51) Int. Cl.[7] ............................. F16L 35/00; F16L 37/00
(52) U.S. Cl. ..................... 285/3; 285/124.1; 285/124.3; 285/124.5; 116/200; 411/2
(58) Field of Search ...................... 285/3, 124.1, 124.3, 285/124.5, FOR 118

(56) References Cited

U.S. PATENT DOCUMENTS

| | | | |
|---|---|---|---|
| 3,202,442 A | * | 8/1965 | Abbey et al. |
| 3,844,585 A | * | 10/1974 | Sands et al. |
| 3,874,710 A | | 4/1975 | Courtot |
| 3,929,356 A | * | 12/1975 | DeVincent et al. |
| 4,022,496 A | * | 5/1977 | Crissy et al. |
| 4,290,276 A | * | 9/1981 | Knowles |
| 5,294,156 A | * | 3/1994 | Kumazaki |
| 5,323,808 A | | 6/1994 | Shimizu |
| 5,338,075 A | * | 8/1994 | Albrecht |
| 5,354,101 A | * | 10/1994 | Anderson, Jr. |
| 5,464,042 A | | 11/1995 | Haunhorst |
| 5,467,611 A | * | 11/1995 | Cummings |

FOREIGN PATENT DOCUMENTS

| | | |
|---|---|---|
| DE | 4432562 A | 4/1995 |
| EP | 0657680 A | 6/1995 |
| FR | 1423028 A | 3/1966 |
| WO | WO9714893 A | 4/1997 |

OTHER PUBLICATIONS

5780 Series, Quick Connect Precharging Refrigerant Couplings, 1992 Aeroquip Corporation, pp. 2–8.*
5780 Series, Quick Connect Precharging Refrigerant Couplings, Copyright 1992 Aeroquip Corporation, pp. 2–8 Brochure entitled ConnectAire (TM) Aeroquip, undated.

* cited by examiner

Primary Examiner—Lynne H. Browne
Assistant Examiner—Tomlyne A Malcolm
(74) Attorney, Agent, or Firm—Christopher H. Hunter

(57) ABSTRACT

A coupling assembly for use in connecting fluid lines having a unitary female body and a male coupling portion. The female body includes at least two passageways having frangible diaphragms. The male coupling portion includes at least two male coupling halves having frangible diaphragms. Cutting devices are positioned in the passageways of the female body. As the male coupling portion is moved toward the female body by a bracket and fastening device, the diaphragms are ruptured to allow fluid flow between the lines.

10 Claims, 8 Drawing Sheets

US 6,382,678 B1

COUPLING ASSEMBLY

This application claims the benefit of U.S. Provisional Application No.: 60/102,751 Oct. 2, 1998.

BACKGROUND OF THE INVENTION

The present invention relates generally to a coupling assembly. More specifically, the invention is directed to a unitary coupling assembly for use with refrigerant lines.

Refrigerant couplings are known in the art. These types of couplings are used to connect suction lines and liquid lines between indoor and outdoor units of a split-type air conditioning system.

It has been found that there are problems associated with the prior art refrigerant couplings. For example, the coupling halves of the prior art couplings become misaligned thereby causing the improper opening of the diaphragms which can result in blockage of the fluid flow path through the coupling or the presence of loose pieces of the diaphragms in the system. It has also been found that some prior art couplings include fastening or attachment devices that can be over torqued resulting in damage to the couplings.

In view of the foregoing, there is a need for a coupling assembly that provides for the proper alignment of the coupling halves during assembly. There is also a need for a coupling assembly that has a fastening device that cannot be over torqued. The present invention satisfies these needs. The present invention allows for the relatively quick and easy connection of two or more lines at once with proper alignment of the lines.

SUMMARY OF THE INVENTION

The coupling assembly of the present invention is comprised of a unitary female coupling that includes at least two passageways. Each passageway includes a first end adapted to receive a male coupling half and a second end adapted to receive a line. Each passageway includes an annular sealing surface located adjacent to the first end. An annular seal is positioned in an annular groove defined by each passageway adjacent to the first end. A frangible female diaphragm is positioned in each passageway adjacent to the annular seal. A cutting device is positioned in each passageway adjacent to the female diaphragm. A line is positioned in the passageway adjacent to the second end.

The coupling assembly further includes a male coupling portion having at least two male coupling halves. Each of the coupling halves includes a leading end for insertion in the first end of a corresponding passageway of the female body and a trailing end adapted to receive a line. Each coupling half includes a bore that extends between the leading and trailing ends. A frangible male diaphragm is positioned in each bore adjacent to the leading end. An annular sealing surface is located on each coupling half for engaging a corresponding annular sealing edge of the female body to form a metal-to-metal seal therebetween upon full connection. A line is positioned in the bore adjacent to the trailing end.

The coupling assembly includes a bracket for securing the male coupling portion to the female body. A fastening device, such as a threaded bolt, extends through the bracket, the male coupling portion and the female body. As the bolt is torqued or tightened, the bracket engages the male coupling portion to cause it to move toward the female body until the male coupling halves of the male coupling portion are fully inserted in the passageways. The bracket and the bolt maintain the placement of the male coupling portion with respect to the female body.

It is the primary object of the present invention to provide an improved coupling assembly that simplifies connection and ensures proper alignment of male coupling portion with a female body.

Another object of the present invention is to provide a fastening device for a coupling assembly that is difficult to over torque.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
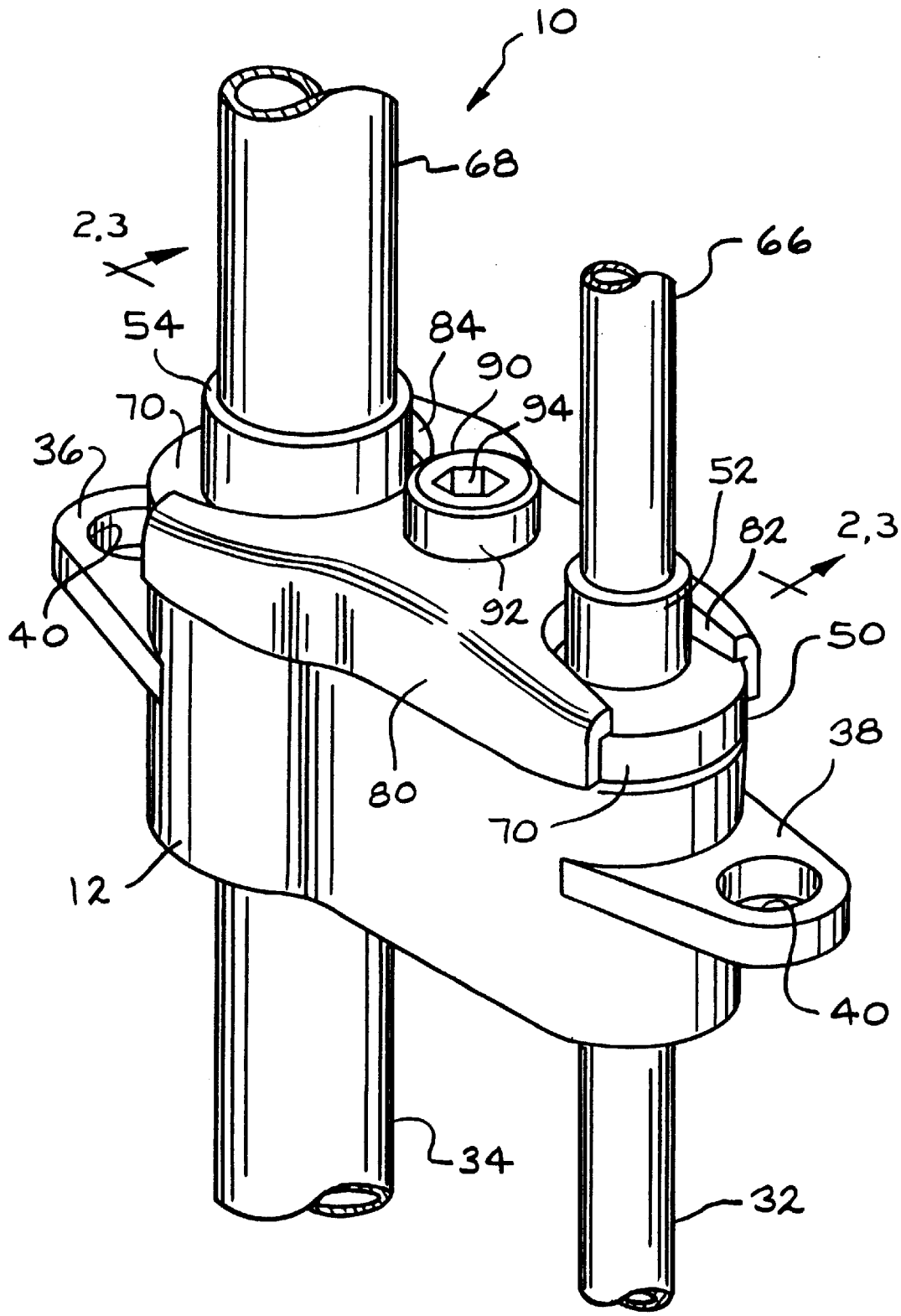
FIG. 1 is a perspective view of a first embodiment coupling assembly according to the present invention.
Figure 2:
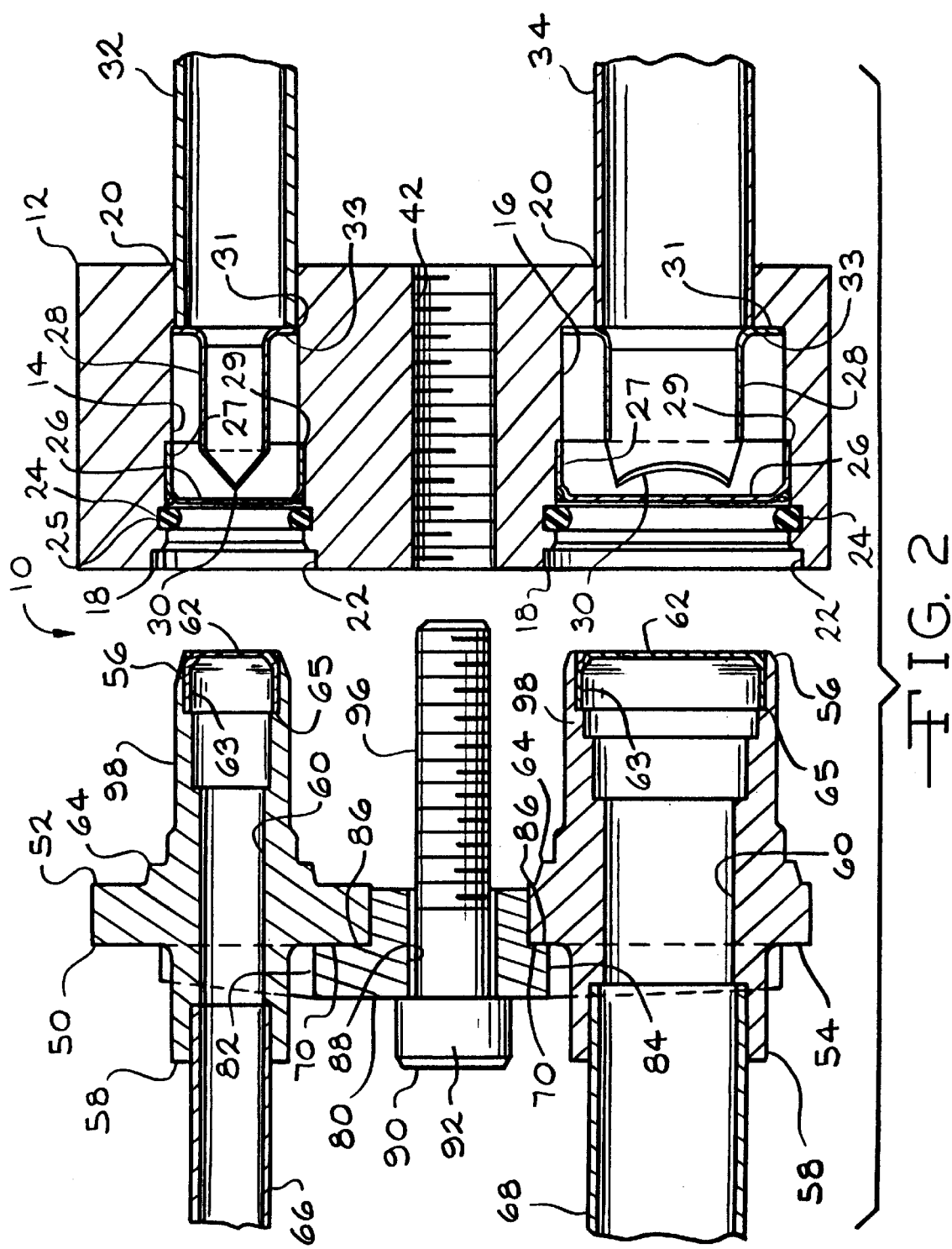
FIG. 2 is a cross-sectional view taken through the center of the first embodiment coupling assembly according to the present invention with the female body separated from the male coupling portion.
Figure 3:
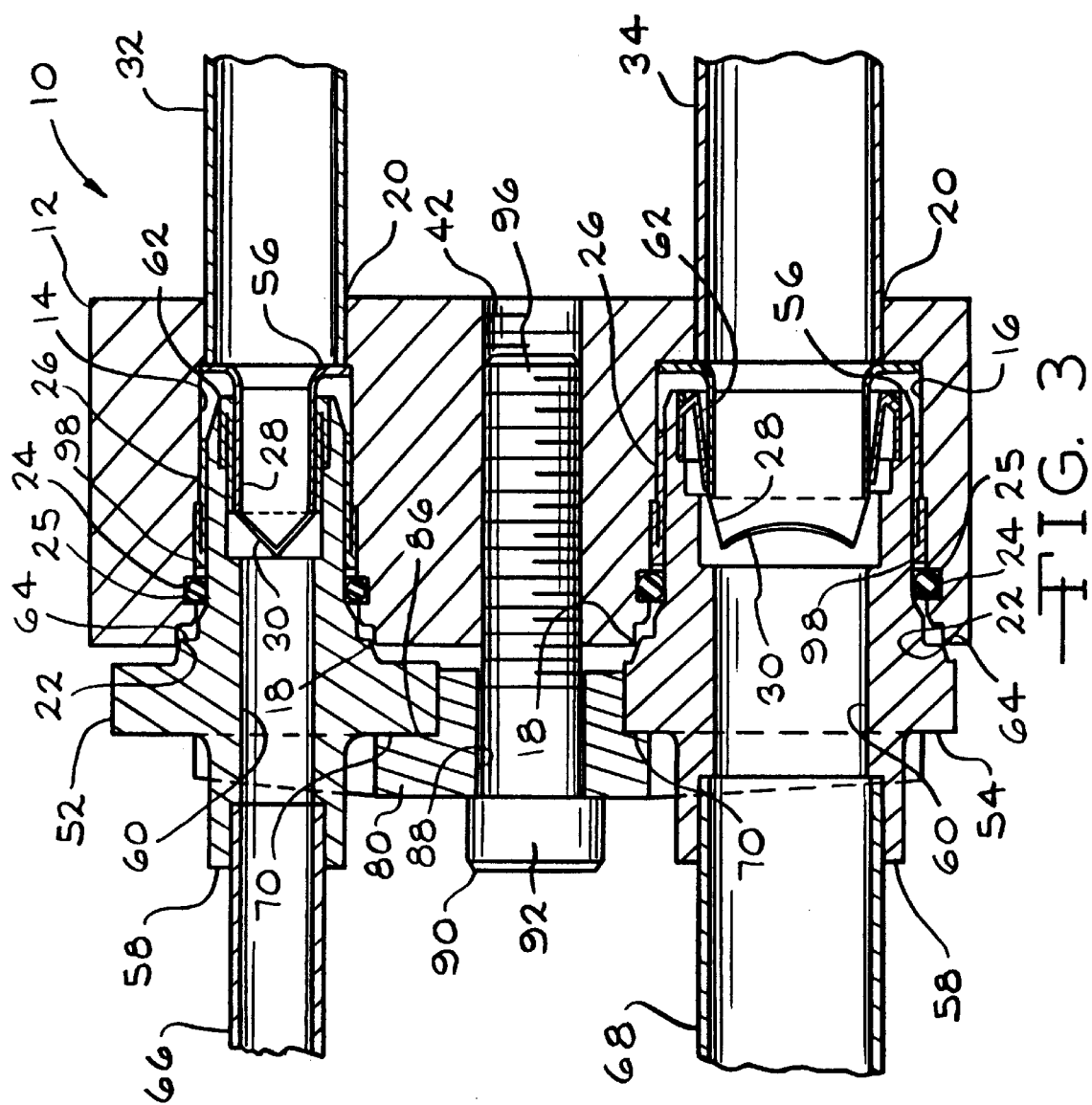
FIG. 3 is a view similar to the view of FIG. 2 showing the female body joined to the male coupling portion.

The preferred embodiments and best mode of the present invention will now be described in detail with reference being made to the drawings. Referring to FIGS. 1–3, a first embodiment coupling assembly 10 is shown. The coupling assembly 10 includes a unitary female body 12 formed of metal that includes at least two cylindrical passageways 14 and 16. The passageways 14 and 16 can either have different diameters as shown in FIG. 2 or identical diameters depending on the application. Each passageway 14 and 16 includes a first end 18 and a second end 20. An annular sealing edge 22 is positioned adjacent to the first end 18 of each passageway 14 and 16. An annular seal 24 is positioned in an annular groove 25 formed in each passageway 14 and 16 adjacent to the first end 18. A frangible metal female diaphragm 26 is positioned in each passageway 14 and 16 adjacent to the annular seal 24 and has an annular sidewall 27 soldered or brazed to the inside surface of each passageway 14 and 16. The end of the sidewall 27 engages a shoulder 29 in each passageway 14 and 16. A metal cutting device 28 having a sharp edge 30 is positioned in each passageway 14 and 16 adjacent to the female diaphragm 26. The size and shape of the cutting device 28 is determined by the diameter of the passageway in which it is positioned. The cutting device 28 has an annular flange 33 at the end opposite the cutting edge 30 which rests against a shoulder 31 of the female body 12 adjacent to each passageway 14 and 16.

A first line 32 is positioned in the first passageway 14 adjacent to the second end 20. A second line 34 is positioned in the second passageway 16 adjacent to the second end 20. As shown in FIG. 1, the female body 12 includes two mounting flanges 36 and 38. Each of the mounting flanges 36 and 38 includes an opening 40 for receiving, for example, a threaded bolt (not shown) to attach the female body 12 to, for example, an outside unit of a split-type air conditioning system (not shown). As shown in FIG. 2, the female body 12 includes a threaded opening 42.

Still referring to FIGS. 1–3, the coupling assembly 10 includes a male coupling portion 50 including a first male coupling half 52 and a separate second male coupling half 54. The first and second coupling halves 52 and 54 are formed of metal. Each coupling half 52 and 54 includes a leading end 56, a trailing end 58 and a cylindrical bore 60 extending between the leading and trailing ends 56 and 58. As shown in FIG. 2, the leading ends 56 of the first and second male coupling halves 52 and 54 are sized and configured for insertion in the first ends 18 of the first and second passageways 14 and 16, respectively. Each coupling half 52 and 54 includes a frangible metal male diaphragm 62 positioned in the bore 60 adjacent to the leading end 56. Each diaphragm 62 has an annular sidewall 63 soldered or brazed to the inside surface of its respective bore 60 in the area adjacent to the leading end 56. The end of the sidewall 63 engages a shoulder 65 spaced from the leading end 56. Each coupling half 52 and 54 includes an annular sealing surface 64 sized and configured for engagement with a corresponding annular sealing edge 22 of the female body 12. Still referring to FIG. 2, the first male coupling half 52 includes a third line 66 positioned in the bore 60 adjacent to the trailing end 58. The second male coupling half 54 includes a fourth line 68 positioned in the bore 60 adjacent to the trailing end 58. As shown in FIG. 2, each coupling half 52 and 54 includes an annular shoulder 70.

Referring to FIGS. 1–3, the coupling assembly 10 includes a metal bracket 80 having a first recess 82 and a second recess 84. The first recess 82 receives the first male coupling half 52 and the second recess 84 receives the second male coupling half 54. As shown in FIG. 2, each recess 82 and 84 includes a stop 86 that is sized and configured to receive a corresponding annular shoulder 70 of the first and second male coupling halves 52 and 54. As shown in FIG. 2, the bracket 80 defines an opening 88.

Still referring to FIGS. 1–3, the coupling assembly 10 includes a threaded bolt 90 having a head 92 that defines a tool recess 94. The bolt 90 extends through the opening 88 and further includes a threaded portion 96 that is sized and configured to be received by the threaded opening 42 of the female body 12.

Referring to FIG. 3, the intended use of the coupling assembly 10 will be described. Prior to the connection of the female body 12 with the male coupling portion 50, the first, second, third and fourth lines 32, 34, 66 and 68, respectively, are precharged with refrigerant. The female and male diaphragms 26 and 62 prevent the escape of refrigerant from the lines 32, 34, 66 and 68. The female body 12 is connected to the male coupling portion 50 by the insertion of the first and second male coupling halves 52 and 54 into the first ends 18 of the first and second passageways 14 and 16, respectively. The bracket 80 is positioned adjacent to the annular shoulders 70 of the first and second male coupling halves 52 and 54. The bolt 90 is inserted through the opening 88 of the bracket 80 and into the threaded opening 42 of the female body 12. A tightening tool, such as a wrench (not shown), is inserted into the tool recess 94 of the head 92 of the bolt 90.

The bolt 90 is then torqued so that the threaded portion 96 of the bolt 90 engages the threaded opening 42 to draw the bracket 80 toward the female body 12. The stops 86 of the bracket 80 engage the annular shoulders 70 of the first and second male coupling halves 52 and 54 to cause them to be in axial alignment with the first and second passageways 14 and 16.

Still referring to FIG. 3, as the first and second male coupling halves 52 and 54 are moved into the first and second passageways 14 and 16, the sharp edges 30 of the cutting devices 28 of the female body 12 engage first the female diaphragms 26 and then the male diaphragms 62 to cause the diaphragms 26 and 62 to rupture or open and to fold away from the fluid flow path defined by the respective passageways 14 and 16 and bores 60. As it will be appreciated, this allows the first and second passageways 14 and 16 of the female body 12 to be in fluid communication with the bores 60 of the first and second male coupling halves 52 and 54. Accordingly, this allows for the movement of refrigerant through the first, second, third and fourth lines 32, 34, 66 and 68, respectively.

As shown in FIG. 3, the bolt 90 is torqued until the bracket 80 causes the annular sealing surfaces 64 of the first and second male coupling halves 52 and 54 to engage the corresponding annular sealing edges 22 of the female body 12. This provides "metal-to-metal" seals between the female body 12 and the first and second male coupling halves 52 and 54. The annular seals 24 maintain seals between the exterior surfaces 98 of the first and second male coupling halves 52 and 54 and the first and second passageways 14 and 16 of the female body 12 to prevent leakage of refrigerant during connection.

Figure 4:
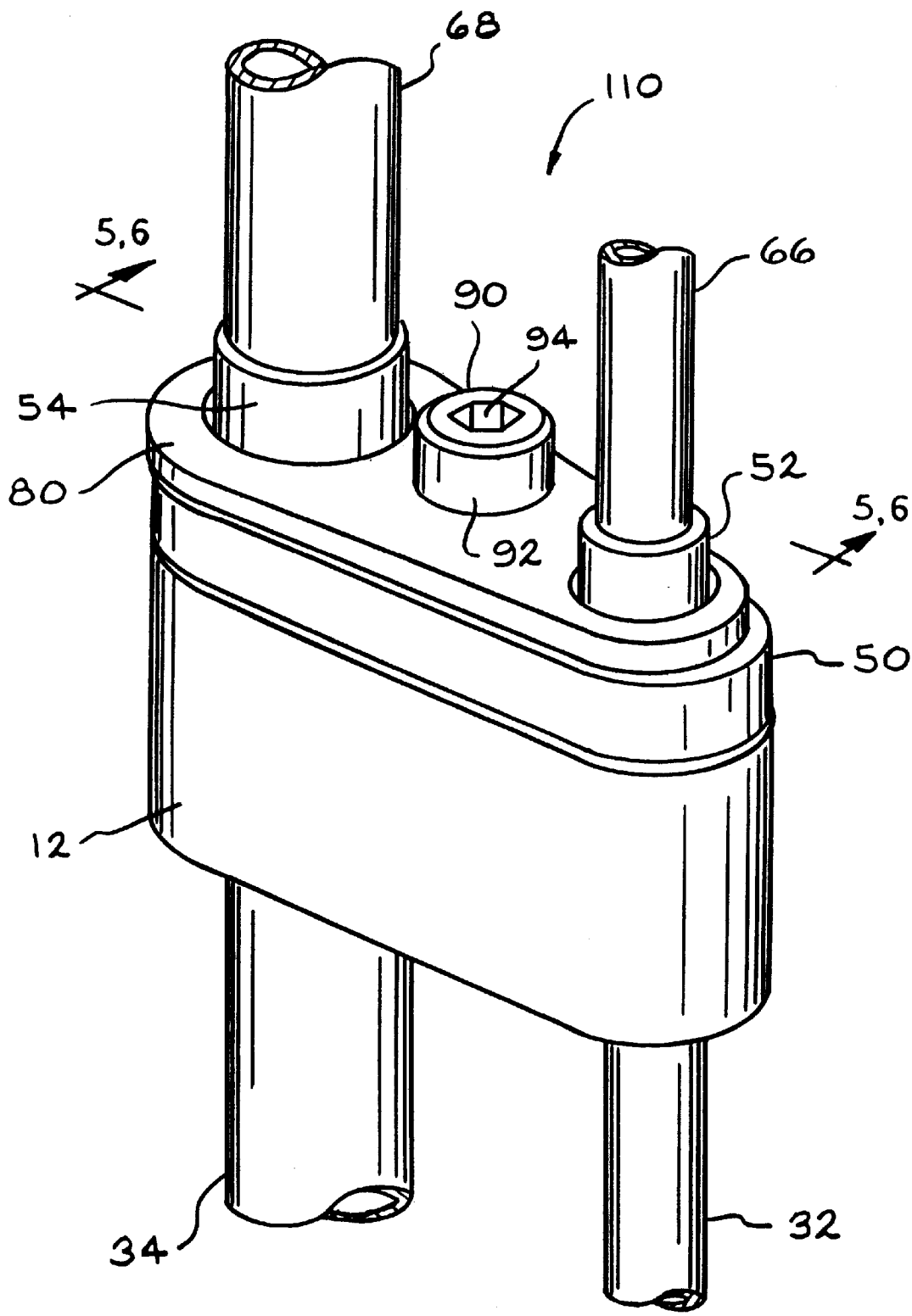
FIG. 4 is a perspective view of a second embodiment coupling assembly according to the present invention.
Figure 5:
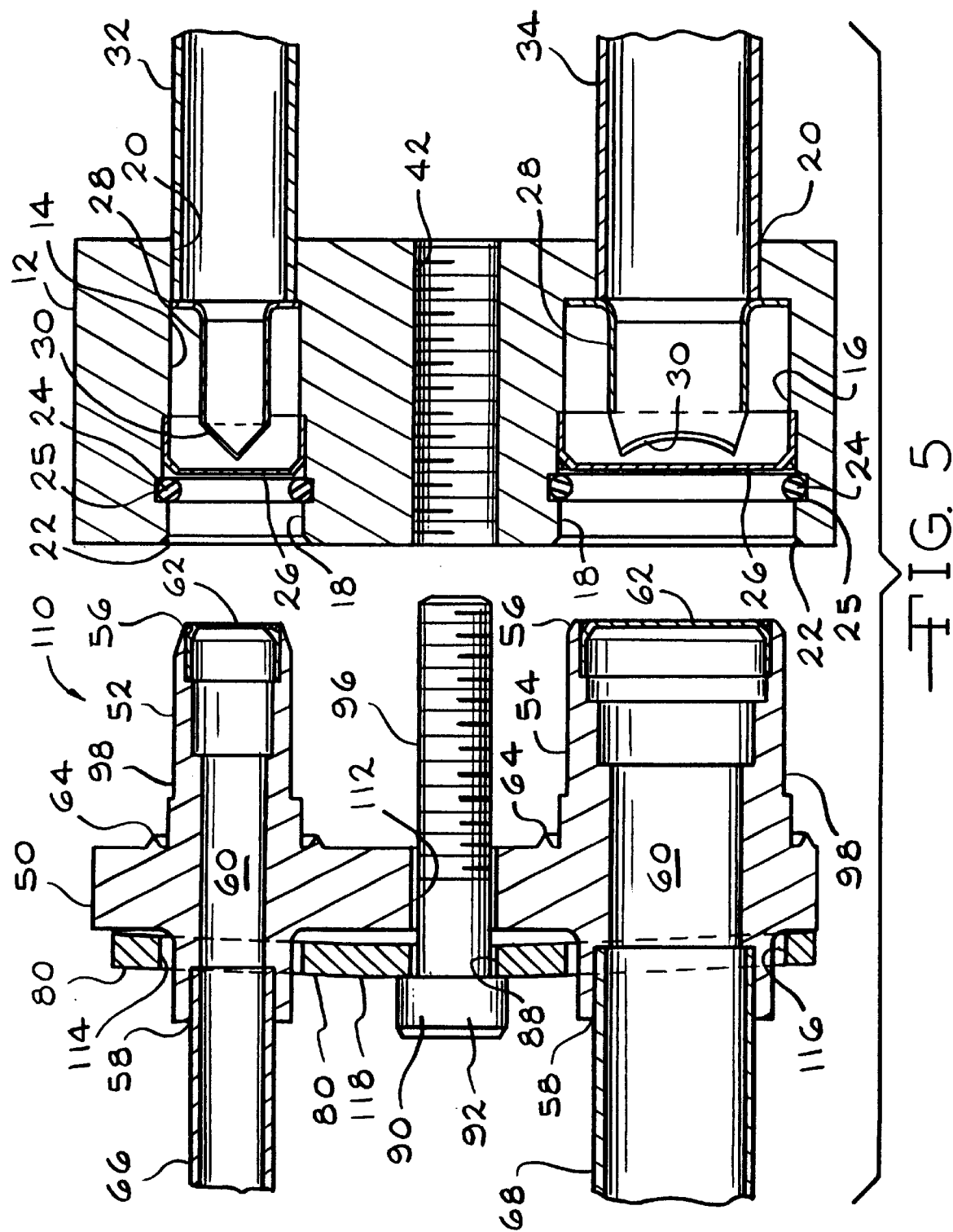
FIG. 5 is a cross-sectional view taken through the center of the second embodiment coupling assembly according to the present invention with the female body separated from the male coupling portion.
Figure 6:
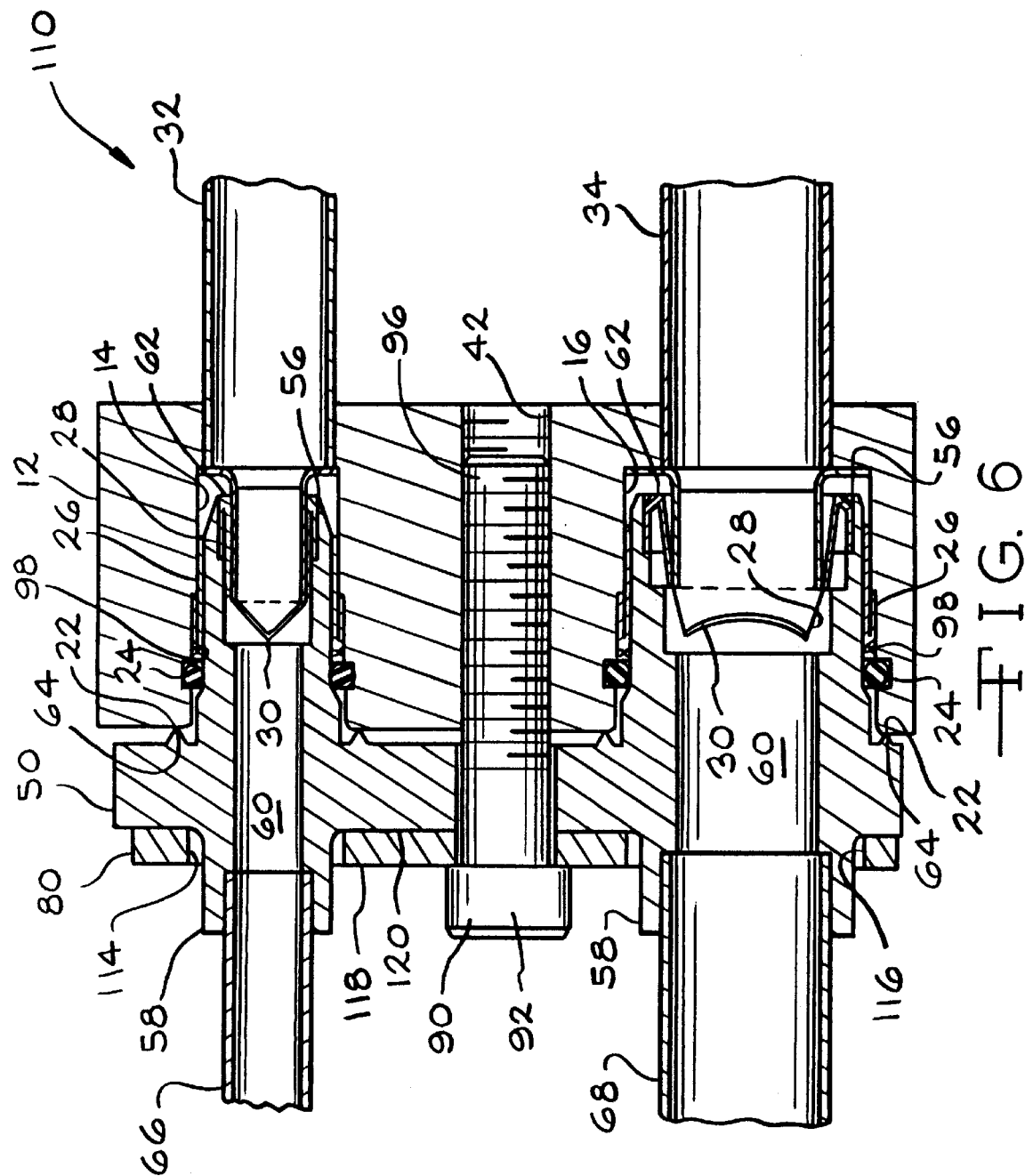
FIG. 6 is a view similar to the view of FIG. 5 showing the female body joined to the male coupling portion.

A second embodiment coupling assembly 110 is shown in FIGS. 4–6. The coupling assembly 110 includes the elements described above with respect to the first embodiment coupling assembly 10. In the coupling assembly 110, the male coupling portion 50 is unitary. The male coupling portion 50 includes an opening 112 for receiving the bolt 90. The bracket 80 includes a first opening 114 and a second opening 116 that are sized and configured to receive the trailing ends 58 of the first and second coupling halves 52 and 54. As shown in FIG. 5, the bracket 80 includes a center portion 118 that is bowed. As shown in FIG. 6, the head 92 of the bolt 90 engages the center portion 118 and forces it toward the male coupling portion 50 so that the bracket becomes flush with an exterior surface 120 of the male coupling portion 50 to equally distribute the clamping force on the male coupling portion 50 and to provide a visual indication that the bolt 90 has been properly torqued.

Figure 7:
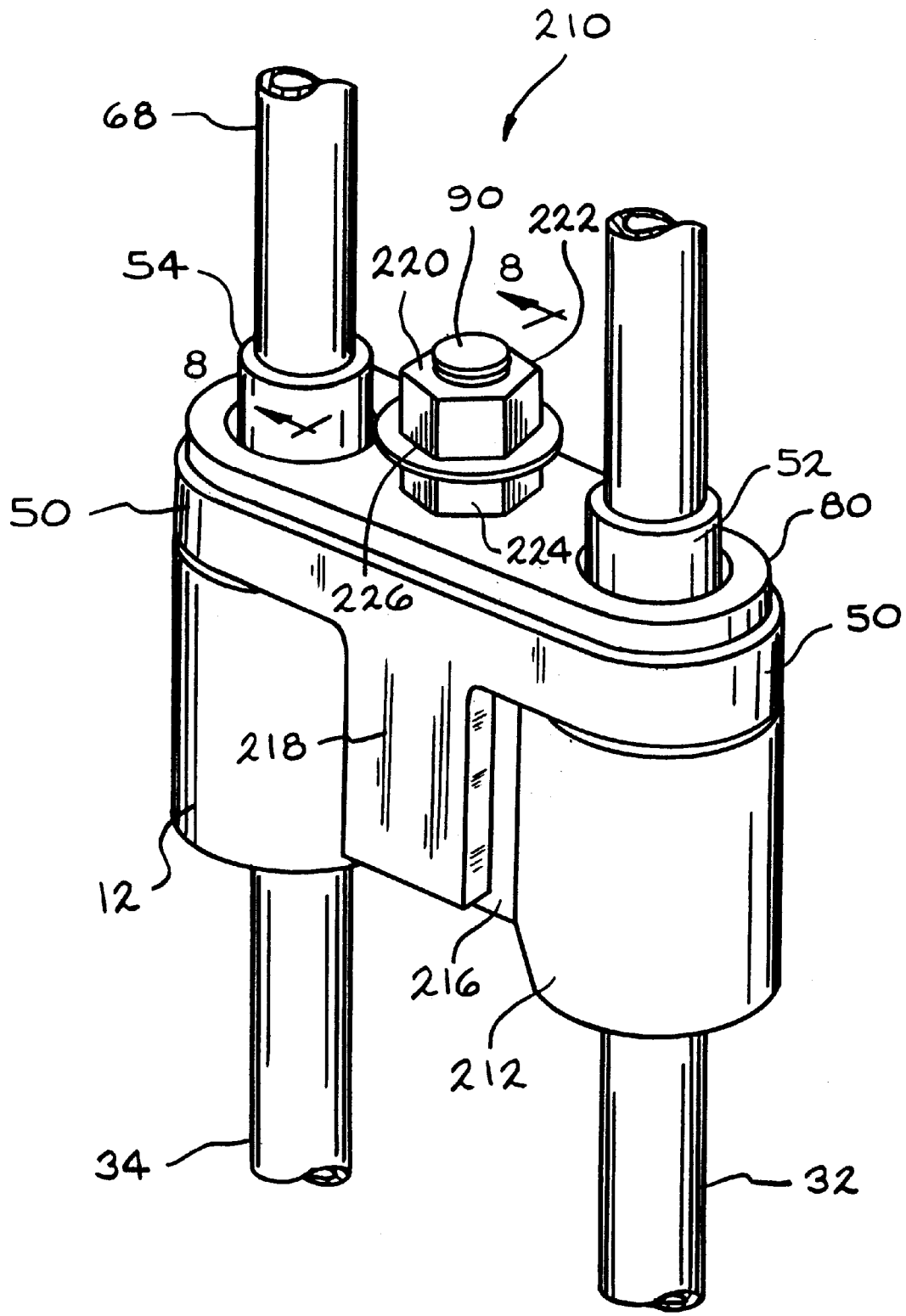
FIG. 7 is a perspective view of a third embodiment coupling assembly according to the present invention.
Figure 8:
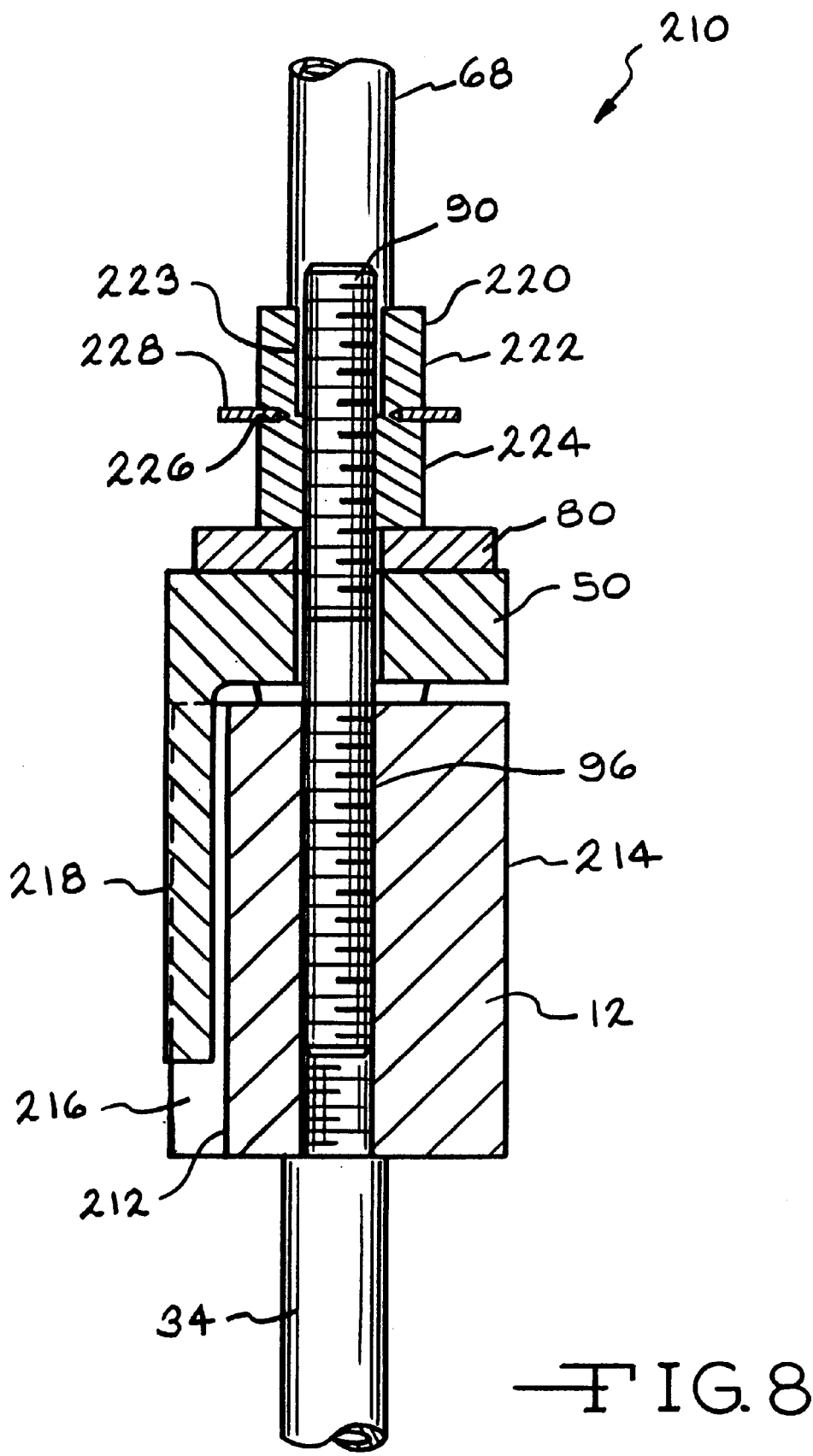
FIG. 8 is a cross-sectional view of the third embodiment coupling assembly according to the present invention showing the female body joined to the male coupling portion.

A third embodiment coupling assembly 210 is shown in FIGS. 7 and 8. The coupling assembly 210 includes the elements described above with respect to the first embodiment coupling assembly 10. In the coupling assembly 210 the female body 12 has a first side 212 and a second side 214. The first side 212 includes a recess 216. The male coupling portion 50 includes a projection 218 that is received by the recess 216 of the female body 12. This ensures the proper alignment of the female body 12 with respect to the male coupling portion 50.

Still referring to FIGS. 7 and 8, the coupling assembly 210 further includes a frangible head 220 having an unthreaded top portion 222 and a threaded bottom portion 224. The unthreaded top portion 222 has an inwardly facing wall surface 223 spaced from the bolt 90. An annular slot 226 partially divides the top portion 222 from the bottom portion 224. A washer 228 is positioned in the slot 226. When the female body 12 is connected to the male coupling portion 50, a wrench (not shown) engages the top portion 222. The washer 228 prevents contact between the wrench and the bottom portion 224. The head 220 has a predetermined torque value as determined by the depth of the slot 226 and the thickness of the metal between the radially innermost portion of the slot 226 and the wall surface 223 so that once the proper amount of torque has been applied to the head 220, the top portion 222 breaks away from the bottom portion 224.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A coupling assembly, comprising:
   (A) a unitary female body including at least two passageways, each of said passageways including:
      (i) a first end adapted to receive a male coupling half and a second end adapted to receive a conduit;
      (ii) an annular sealing edge positioned adjacent to said first end;
      (iii) an annular seal positioned in said passageway adjacent to said first end;
      (iv) a frangible female diaphragm positioned in said passageway adjacent to said annular seal;
      (v) cutting means positioned in said passageway adjacent to said female diaphragm for cutting said female diaphragm;
      (vi) a conduit positioned in said passageway adjacent to said second end;
   (B) a male coupling member including at least two male coupling halves, each of said coupling halves including:
      (i) a leading end for insertion in said first end of said passageway and a trailing end adapted to receive a second conduit, a bore extending between said leading and trailing ends;
      (ii) a frangible male diaphragm positioned in said bore adjacent to said leading end;
      (iii) an annular sealing surface for engaging said annular sealing edge to form a seal therebetween;
      (iv) a second conduit positioned in said bore adjacent to said trailing end;
      (v) an annular shoulder;
   (C) a bracket including at least two recesses for receiving said at least two male coupling halves, each of said recesses including a stop for engaging each of said annular shoulders of said first and second coupling halves for securing said male coupling member to said female body; and
   (D) fastening means for fastening said bracket on said coupling assembly.

2. The coupling assembly of claim 1, wherein each of said passageways is substantially cylindrical.

3. The coupling assembly of claim 2, wherein said passageways have different diameters.

4. The coupling assembly of claim 2, wherein said passageways have substantially identical diameters.

5. The coupling assembly of claim 1, wherein said male coupling member is unitary.

6. The coupling assembly of claim 1, wherein said bracket includes a bowed center portion prior to securement of said male coupling member to said female body.

7. The coupling assembly of claim 1, wherein said fastening means consists of a threaded bolt extending through said bracket into a threaded opening included on said female body.

8. The coupling assembly of claim 7, wherein said bolt includes a frangible head having an unthreaded top portion and a threaded bottom portion.

9. A coupling assembly, comprising:
   (A) a unitary female body including at least two passageways, each of said passageways including:
      (i) a first end adapted to receive a male coupling half and a second end adapted to receive a conduit;
      (ii) an annular sealing edge positioned adjacent to said first end;
      (iii) an annular seal positioned in said passageway adjacent to said first end;
      (iv) a frangible female diaphragm positioned in said passageway adjacent to said annular seal;
      (v) cutting means positioned in said passageway adjacent to said female diaphragm for cutting said female diaphragm;
      (vi) a conduit positioned in said passageway adjacent to said second end;
   (B) a male coupling member including at least two male coupling halves, each of said coupling halves including:
      (i) a leading end for insertion in said first end of said passageway and a trailing end adapted to receive a second conduit, a bore extending between said leading and trailing ends;
      (ii) a frangible male diaphragm positioned in said bore adjacent to said leading end;
      (iii) an annular sealing surface for engaging said annular sealing edge to form a seal therebetween;
      (iv) a second conduit positioned in said bore adjacent to said trailing end;
   (C) a bracket for securing said male coupling member to said female body, said bracket including a bowed center portion prior to securement of said male coupling member to said female body; and
   (D) fastening means for fastening said bracket on said coupling assembly.

10. A coupling assembly, comprising:
    (A) a unitary female body including at least two passageways, each of said passageways including:
       (i) a first end adapted to receive a male coupling half and a second end adapted to receive a conduit;
       (ii) an annular sealing edge positioned adjacent to said first end;
       (iii) an annular seal positioned in said passageway adjacent to said first end;
       (iv) a frangible female diaphragm positioned in said passageway adjacent to said annular seal;
       (v) cutting means positioned in said passageway adjacent to said female diaphragm for cutting said female diaphragm;
       (vi) a conduit positioned in said passageway adjacent to said second end;
    (B) a male coupling member including at least two male coupling halves, each of said coupling halves including:

(i) a leading end for insertion in said first end of said passageway and a trailing end adapted to receive a second conduit, a bore extending between said leading and trailing ends;

(ii) a frangible male diaphragm positioned in said bore adjacent to said leading end;

(iii) an annular sealing surface for engaging said annular sealing edge to form a seal therebetween;

(iv) a second conduit positioned in said bore adjacent to said trailing end;

(C) a bracket for securing said male coupling member to said female body; and (D) a threaded bolt extending through said bracket into a threaded opening included on said female body for fastening said bracket on said coupling assembly, said bolt including a frangible head having an unthreaded top portion and a threaded bottom portion, an annular slot being positioned between said top and bottom portions, and a washer being positioned in said slot.

* * * * *